United States Patent
Karn et al.

(10) Patent No.: US 7,788,449 B2
(45) Date of Patent: Aug. 31, 2010

(54) CACHE CONFIGURATION IN A DATABASE SYSTEM

(75) Inventors: Holger Karn, Aidlingen (DE); Sven Miller, Ulm (DE)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 11/734,144

(22) Filed: Apr. 11, 2007

(65) Prior Publication Data
US 2008/0071987 A1 Mar. 20, 2008

(30) Foreign Application Priority Data
Sep. 20, 2006 (EP) .................................. 61209367

(51) Int. Cl.
*G06F 12/00* (2006.01)
(52) U.S. Cl. .................. 711/118; 711/113; 707/E17.12
(58) Field of Classification Search ........................ 707/1
See application file for complete search history.

(56) References Cited

U.S. PATENT DOCUMENTS

| | | | |
|---|---|---|---|
| 5,394,531 A * | 2/1995 | Smith .......................... | 711/136 |
| 5,452,440 A | 9/1995 | Salsburg | |
| 5,606,688 A | 2/1997 | McNutt et al. | |
| 5,608,890 A | 3/1997 | Berger et al. | |
| 5,675,797 A * | 10/1997 | Chung et al. ................. | 718/104 |
| 5,680,573 A | 10/1997 | Rubin et al. | |
| 5,732,240 A | 3/1998 | Caccavale | |
| 5,822,749 A | 10/1998 | Agarwal | |
| 6,129,458 A * | 10/2000 | Waters et al. ................ | 711/133 |
| 7,107,400 B2 | 9/2006 | Benhase et al. | |
| 7,287,144 B2 | 10/2007 | Hama | |
| 2004/0193801 A1 | 9/2004 | Benhase et al. | |
| 2005/0160225 A1* | 7/2005 | Presler-Marshall .......... | 711/119 |
| 2005/0268037 A1* | 12/2005 | Hama et al. .................. | 711/118 |

FOREIGN PATENT DOCUMENTS

JP    10320212    12/1998

OTHER PUBLICATIONS

"Self Tuning Memory", DB2 http://publib.boulder.ibm.com/infocenter/db2luw/v9/topic/com.ibm.db2.udb.admin.doc/doc/c0021627.htm, Aug. 16, 2006.

(Continued)

*Primary Examiner*—Shane M Thomas
*Assistant Examiner*—John P Fishburn
(74) *Attorney, Agent, or Firm*—Kunzler Needham Massey & Thorpe (57) ABSTRACT

A computer-implemented method is disclosed. The method includes collecting cache-efficiency-indicator values of an at least one cache fragment during operation of a database system over a period of time. Providing approximation-function-parameter values for the collected, cache-efficiency-indicator values, an approximation function representing a relation between a cache-efficiency-indicator and the size of a respective cache fragment. The method continues by providing a set of workload windows based on the approximation-function-parameter values. Next, providing a workload-window information for the set of workload windows, the workload-window information including at least one approximation-function-parameter value representing each determined workload window. The method further includes storing the workload-window information for a comparison based on current, cache-efficiency-indicator values and the workload-window information.

18 Claims, 9 Drawing Sheets

OTHER PUBLICATIONS

Ahuja, Rav, "Introducing DB2 9, Part 3: Self-Tuning Memory in DB2 9", http://www-128.ibm.com/developerworks/db2/library/techarticle/dm-0606ahuja/index.html, Jun. 1, 2006.

Administration Guide: Chapter 26. Tuning DB2 Buffer, EDM, RID, and Sort Pools, http://publib.boulder.ibm.com/cgi-bin/bookmgr/BOOKS/dsnagj13/5.4.1?DT=20060120134741, Feb. 2006.

Battiti, Roberto. "Reactive Search: Toward Self-Tuning Heuristics". Modern Heuristic Search Methods, ch. 4, II. 61-83. John Wiley and Sons Ltd, 1996. 23 pages.

Santhanakrishnan et al. "GD-GhOST: A Goal-Oriented Self-Tuning Caching Algorithm." 2004 ACM Symposium on Applied Computing. pp. 1141-1145.

Wu et al. "E-MACSC: A Novel Dynamic Cache Tuning Technique to Maintain the Hit Ratio Prescribed by the User in Internet Applications." Springer, 2006. pp. 65-72.

Xi et al. "An Analytical Model for Buffer Hit Rate Prediction." IBM canada Ltd., Communications and Information Technology Ontario (CITO) and the National Science and Engineering Research Council. (2001). 12 pages.

Pitkow et al. "A Simple Yet Robust Caching Algorithm Based on Dynamic Access Patterns." Graphics, Visualization, & Usability Center, College of Computing, Georgia Institute of Technology. (1994). 8 pages.

5.4.1 Tuning Database Buffer Pools, [http://publib.boulder.ibm.com/cgi-bin/bookmgr/BOOKS/dsnagi13/5.4.1?DT=20060120134741], Jun. 2006.

* cited by examiner

CACHE CONFIGURATION IN A DATABASE SYSTEM

CROSS-REFERNCE TO RELATED APPLICATIONS

Under 35 U.S.C. 119(a)-(d), this application claims the benefit of priority to DE Applications No. 06120936.7, filed on Sep. 20, 2006.

FIELD OF THE INVENTION

The present invention relates generally to cache configuration in a database system.

DESCRIPTION OF RELATED ART

The usage of a database system may change very significantly over a period of time. For example, the database usage changes typically over 24 hours due to typical user activities during working times and to batch jobs for mass data processing during the night. To achieve preferably optimal system throughput, an internal cache of the database system should be adapted to the respective currently executed workload.

Caches are structures which keep data in memory after the data is currently no longer in use, which avoids having to recreate or reload data from a disc if the data is reused. Typical caches in a database are built to cache application data in database tables, but also to cache control data used by the database manager to process the application data. The goal of caches is to minimize the chance that data is not found. Cache efficiency depends upon both appropriate sizes to keep the most re-used data and upon algorithms which assign data to a cache for a specified period of time. Currently, setting up data caching in a database cache memory is difficult.

U.S. Pat. No. 5,822,749 discloses an optimizer for formulating an optimal buffer cache strategy for a given query. A buffer cache is a cache memory to be used to load and cache data from the disk or tape storage of a database system. Thereby the optimizer communicates with a buffer manager before a query plan is formulated. The optimizer queries the buffer manager for the purpose of determining whether the object of interest exists in its own cache fragment. If the object exists in its own cache fragment, the optimizer inquires as to how much of the cache fragment the object requires, together with the optimal Input/Output (I/O) size for the cache fragment. Based on this information, the optimizer formulates the query plan with hints, which are ultimately passed to the buffer manager. Based on those hints received from the optimizer, the buffer manager can fine tune I/O, i.e. the cache management for the query. The drawback of this solution is that the size of the cache memory, its fragmentation, i.e. the number of cache fragments, and also the size of the individual cache fragments has to be adjusted manually. Due to this, during usage of the database, the size of the cache memory and its fragmentation is fixed. The optimizer along with the buffer manager determines the order of objects, or if a cache fragment is smaller than an object, the portions of objects cached and the period of time they remain cached until they are deleted.

U.S. Pat. No. 5,680,573 discloses a method to cache objects of a database system, wherein different, fixed-cache fragments are used to cache objects that are selected randomly and non-randomly. The cache fragments used to cache the objects that are selected non-randomly are larger than the cache fragments used to cache the objects that are selected randomly. Therefore, cache-fragment size optimization fragments and/or of the cache itself takes place during operation of the database system.

Japanese Patent No. JP 10 320 212 A2 discloses a method for cache optimization based on a cache-miss-ratio prediction. Thereby a cache simulation object program is used to simulate the cache-miss-ratio of a database. During operation of the database the size of the cache fragments is fixed according to the prediction gained by the simulation.

Furthermore, it is known to group single objects or groups of objects into work sets. Such working sets are also known for queries or groups of queries. From JP 7 271 674 A2 and from U.S. Pat. No. 6,129,458 methods for cache optimization are known, such that a working set comprising a plurality of objects is larger than a cache fragment used to cache the working set, the working set is subdivided into working subsets that are cached in different cache fragments.

According to the state of the art, the cache memory used to cache data of a database system has a fixed size. Such a cache memory can be fragmented into a plurality of cache fragments, each one to be used to cache a single or a group of objects of the database. Changing sizes of the cache memory and/or of the cache fragments can result in changes in a system's performance. According to the state of the art, during database operation cache fragments have either a fixed size or are resized dynamically based on limited algorithms. A known method includes simply reducing the size of the best performing cache fragment and increasing the size of the worst performing cache fragment in regular intervals. Thereby only two cache fragments are changed per transaction, wherein most of the cache fragments remain unchanged. Furthermore, changing the cache fragments takes place independent from previous analysis cycles. As such, in a following cycle, those changing might be counterproductive and therefore the aforementioned method is not applicable to improve performance of database systems.

Today, constructing an optimal configuration requires either re-simulating an entire workload for various cache fragment sizes and choosing an optimal one, or estimating the impact of fragment size changes. The first option normally takes hours to process on a workstation, which makes it difficult for a desirable, automatic-continuous-background optimization. The later option depends upon multiple factors and must be performed for all objects and statements in the database (e.g. tables, Materialized Query Tables (MQTs), index and the like), which makes it normally impossible for continuous manual optimization. Even if a Data Base Administrator (DBA) has constructed a suitable configuration, the database workload alternates and changes frequently, which results in poor system throughput.

Accordingly, a need exists for a cache configuration method in a database system that enables efficient database usage. It is furthermore appreciated that a need exists for similar problems in other data processing systems.

SUMMARY OF THE INVENTION

A first aspect of the present invention provides a computer-implemented method for constructing workload windows in a database system having at least one cache fragment. The method comprises collecting cache-efficiency-indicator values of the at least one cache fragment during operation of the database system over a period of time. The method also comprises providing a plurality of approximation-function-parameter values for the collected, cache-efficiency-indicator value and an approximation function representing a relation between a cache-efficiency-indicator and a size of a respective cache fragment. Furthermore, the method comprises providing a set of workload windows based on the approximation-function-parameter value and providing workload-window information for the set of workload windows, the workload-window information including at least one approximation-function-parameter value representing each determined workload window. The method further includes storing the workload-window information for a comparison based on current, cache-efficiency-indicator values and the workload-window information.

The present invention provides also computer program products, each comprising a computer usable medium including a computer readable program.

BRIEF DESCRIPTION OF THE DRAWINGS

The present invention is illustrated by way of example, and not by the way of limitation, in the figures of the accompanying drawings in which.

DETAILED DESCRIPTION OF THE INVENTION

The following description is presented to enable one having ordinary skill in the art to make and use the embodiment and is provided in the context of a patent application and the generic principles and features described herein will be apparent to those skilled in the art. Thus, the present embodiment is not intended to be limited to the embodiments shown, but is to be accorded the widest scope consistent with the principles and features described herein.

In the following description and the appended claims, a cache may be divided into a set of sub-parts. The term "cache fragment" refers to such a sub-part of the cache. The cache may be arranged into one or more sub-parts. In the case of one subpart, the cache fragment refers to the whole cache. Typically there is a certain upper limit for the cache size, and the term "cache configuration" refers to adjusting the total size of the cache and/or to adjusting the sizes of the cache fragments within a given total cache size.

A typical characteristic of caches is that all data must be available in the cache before it can be processed. That means that data not available in the cache has to be loaded into the cache first before it can be processed.

Figure 1:
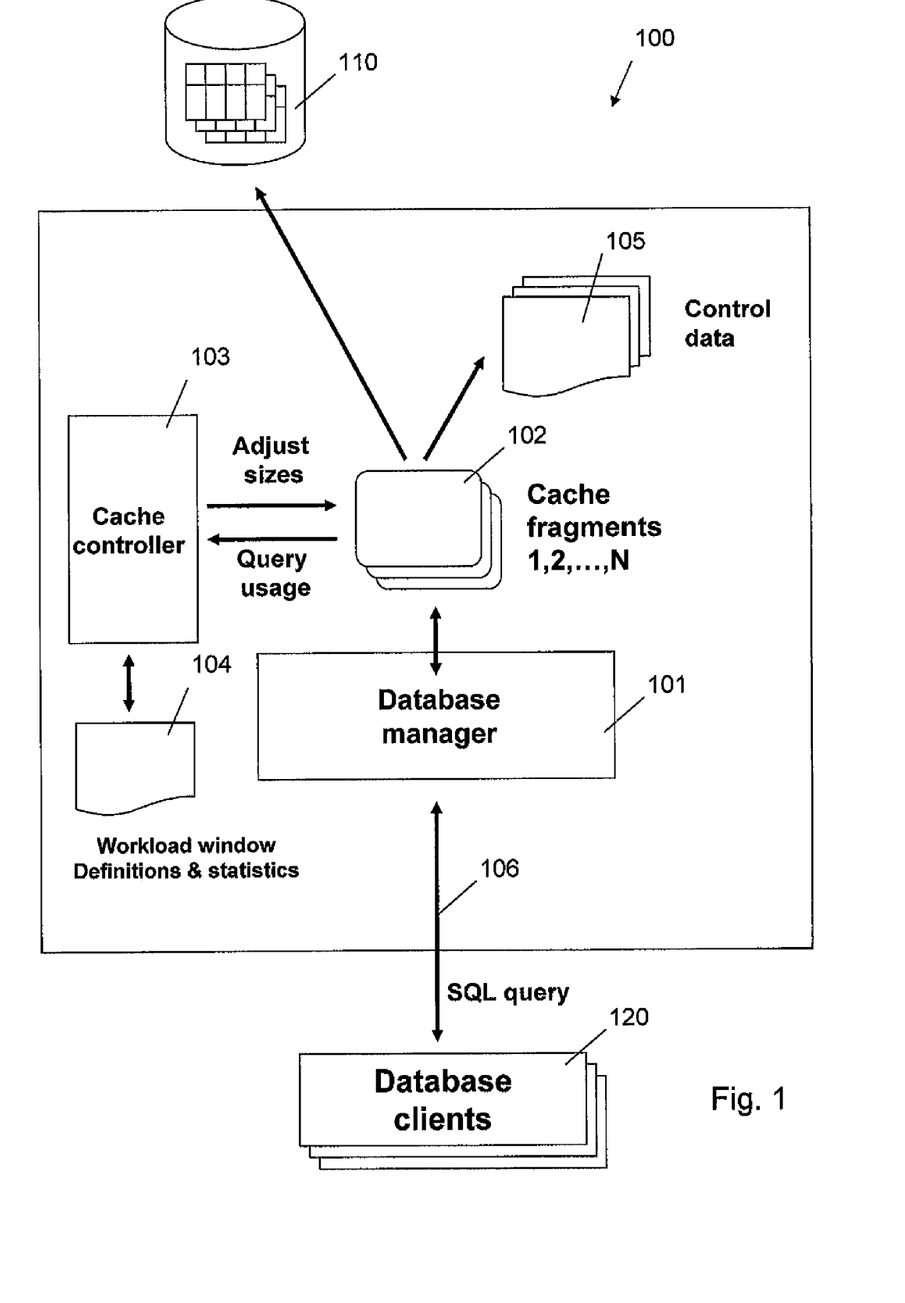
FIG. 1 shows schematically, according to an embodiment, a database system where embodiments of the invention are applicable.

FIG. 1 shows schematically, according to an embodiment, a database system 100, where embodiments of the invention are applicable, together with database clients 120. The database system 100 shown comprises a Database Manager 101, a disk storage 110 and a cache memory 102 for caching data of the disk storage 110. The cache memory 102 is fragmented into cache fragments 1, 2, 3, ..., N, and the cache fragments may cache different types of data.

A database instance takes place by a SQL Query 106. The SQL Query 106 is addressed to the Database Manager 101. The Database Manager 101 handles the SQL Query 106 by accessing the relevant cache fragments 1, 2, 3, ..., N providing data to be modified or prompted by the SQL Query 106. A SQL Query 106 or the handling of a SQL Query 106 by the Database Manager 101 does not directly access the disk storage 110. It always takes place using some of the cached data in some of the cache fragments 1, 2, 3, ..., N. Caching data provides a better performance of databases by a faster access to the cache fragments 1, 2, 3, ..., N, than to the disk storage 110, and by caching already prepared data instead of raw data.

To improve the exposure to the database system, the fragmentation of the cache, i.e. the sizes of the cache fragments 1, 2, 3, ..., N, is changed dynamically by a cache controller 103 as described below. Instead of only changing the sizes of the cache fragments individually, it is possible also to change the number of cache fragments. Changing the fragmentation of the cache dynamically means a procedure that is permanently, automatically, and internally performed during the usage of the database system.

The term "workload window" refers to a substantially homogeneous database activity over a period of time. What is considered substantially homogenous depends on the relative changes in database activity over time. The database activity can be characterized with various cache-efficiency-indicator values. These cache-efficiency indicators are typically determined for each cache fraction, resulting in cache-fraction-specific-efficiency-indicator values. An important factor for assessing and characterising workload is the number of pages retrieved from the cache (that is, the number of "get pages") in comparison to the number of times such data was not found in the cache and had to be loaded into the cache first (that is, the number of synchronous read pages). This cache-efficiency indicator is often called the hit ratio.

Figure 2A:
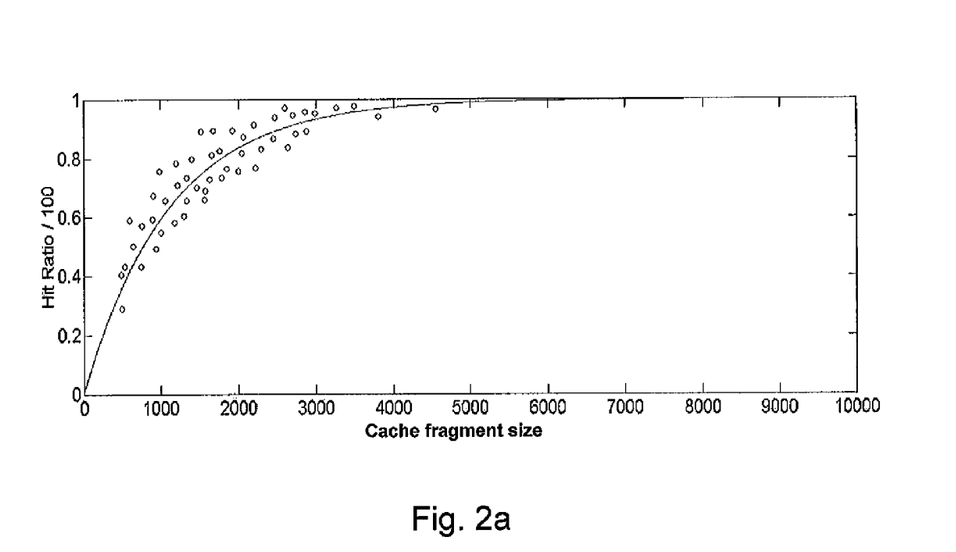
FIG. 2A shows, according to an embodiment, plurality of measured, cache-efficiency-indicator values, measured hit ratio values as a function of the cache fragment size for a homogenous workload.

FIG. 2A shows, as an example of measured, cache-efficiency-indicator values, measured hit ratio values as a function of the cache fragment size for a homogenous workload. In FIG. 2A, the relation between the hit ratio and the cache fragment size is modelled with an approximation function, where the dependence on the cache fragment size x is of the form $\exp(c*x)$, where c is a negative parameter whose value is typically determined based on all available measurements in a specific time period. The upper limit for this approximation function is 100, whereby all data retrieved from the cache was found in the cache. The constant c is approximated using available measurements in a specific time slot.

A small absolute value of c is an indication of randomized access, such as many users accessing a database for short queries. A large absolute value of c is an indication of high pre-fetch behaviour of a database optimizing engine. This is typical for batch jobs which process huge number of table rows in a single database transaction.

It may be possible to model the cache behaviour using other type of approximation functions, but in general the parameter value(s) of approximation functions describe the cache behaviour.

For each workload window, it is possible to store information describing the cache behaviour. When the cache behaviour is modelled using approximation functions having parameters, the workload-window information typically includes the relevant parameter values. For the exponential-type approximation function, information indicating values of the cache-fraction-specific parameter c would be stored as part of workload-window information. Also the (nominal) start and stop time of a workload window are typically stored as part of the workload-window information, together with measured hit ratios for a given cache fragment size. In the detailed description below, there are given some further examples of information that can be additionally stored as workload-window information.

Within a workload window, it is possible to optimize the cache fragment sizes based on the approximation functions. The approximation function ties together the cache fragment size and cache-efficiency indicator. If the cache-efficiency indicator is high, there is less need for fetching data from the disk. The cache preparation time is proportional to the cach-efficiency indicator and to the cost in processing time: PREPTIME(CFi)=EFFICIENCY(CFi)*COSTS(CFi). As an example, the cost in processing time for a buffer pool is the product of the total number of accessed pages and the time to read a data page from the disk: COSTS(CFi) =GETPAGES*RDPAGETIME(CFi). The cost function may differ between different cache types. When the times for fetching data to the cache (that is, COSTS(CFi), the fractions of workload associated with each cache fragment CFi and the approximation functions of the cache fragments are known, it is possible to determine such a cache configuration that the total processing time (that is, sum of PREPTIME(CFi) for all cache fragments CFi) is minimized.

Figure 2B:
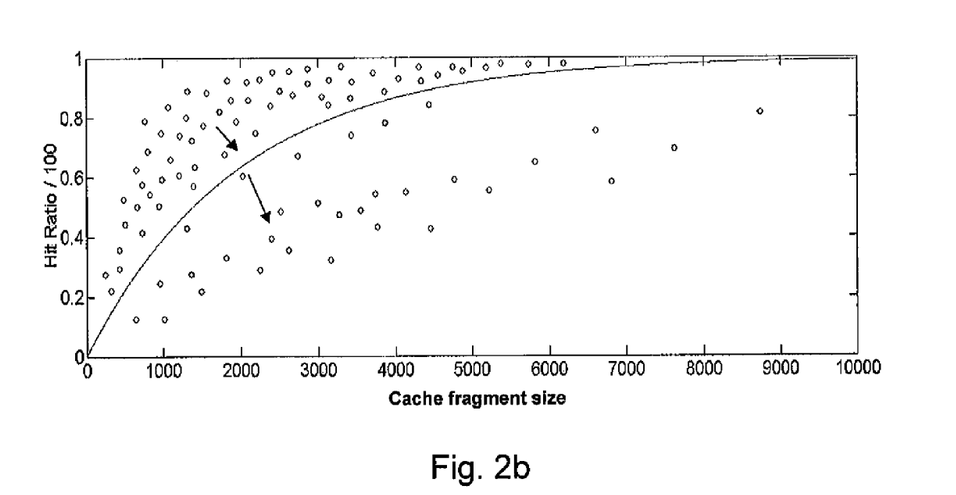
FIG. 2B shows, according to an embodiment, a plurality of measured, cache-efficiency-indicator values, measured hit ratio values as a function of the cache fragment size when a second type of workload is incoming during the measurement period.

The cache behaviour typically depends on the workload. In other words, the cache-efficiency-indicator values corresponding to a cache fragment size vary depending on the current workload. This is shown in FIG. 2B, where the workload has changed over the measurement time, and there are two sets of measured hit ratio values. As FIG. 2B shows, in response to the new measured, cache-efficiency-indicator values, the exponential-type, approximation function starts to take also the new measurement points into account. The more values for the second workload are measured, the more the parameter c is changing from a value describing the first workload to a value describing the second workload.

Figure 3A:
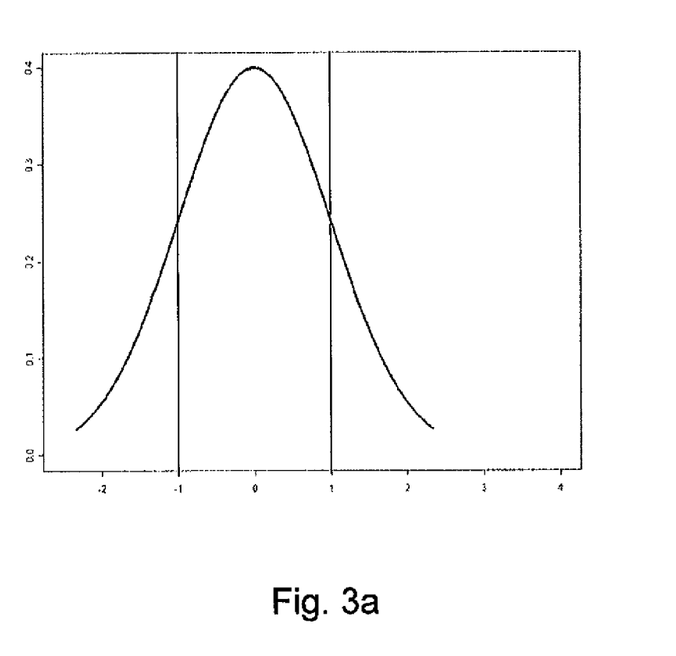
FIG. 3A shows, according to an embodiment, the difference between the measured and predicted hit ratios for a period of time, where the database activity is homogenous.
Figure 3B:
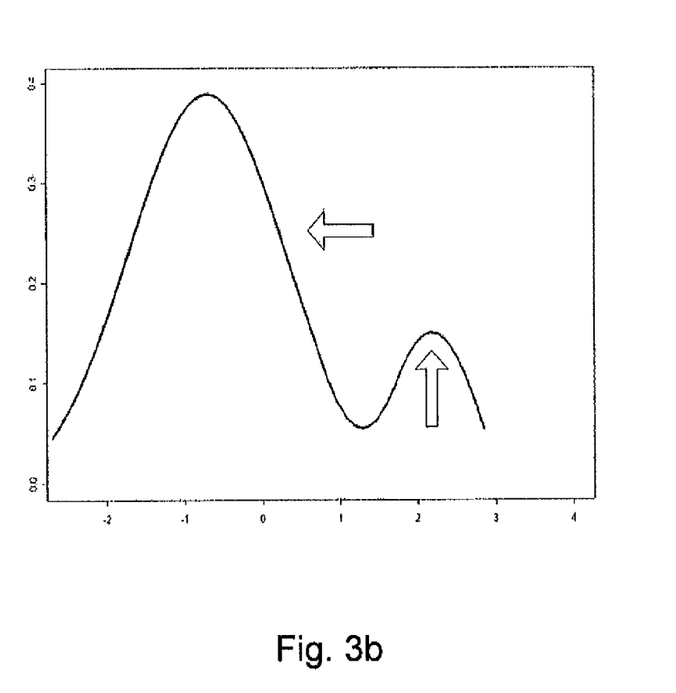
FIG. 3B shows, according to an embodiment, the difference between the measured and predicted hit ratios corresponding to the situation shown in FIG. 2B.

When the cache behaviour for a workload window is modelled by approximation functions, it is possible to compare the measured, cache-efficiency-indicator values with predicted values. The predicted, cache-efficiency-indicator values are obtained from the approximation functions. FIG. 3A shows, according to an embodiment, the difference between the measured and predicted hit ratios for a period of time, where the database activity is homogeneous. In FIG. 3A, the horizontal axis represents the difference between the measured and predicted hit ratios and the vertical axis represents how many such measurements points there are for each difference value. When the database activity changes (as shown in FIG. 2b), the distribution of the differences between the measured and predicted hit rates also changes, as shown in FIG. 3B. Instead of the distribution resembling a Gaussian function, there emerges a second peak.

The cache configuration for the different workloads associated with FIG. 3B should be different, for allowing the database to be efficiently used. If the cache configuration in the database system is defined by workload-window information, the current workload window should be changed when the database activity changes significantly.

To do this, the workload windows have to be defined first. Based on the measurement information, it is possible to define workload windows for time slots having sufficiently homogenous workload. In a second step, the current workload has to be continuously monitored and in response to a significant change in the workload to be switched to a workload window that better reflects the current workload.

When changing workload windows, it is possible that the start times of the workload windows affect the selection of the next workload window. In other words, it is checked whether one of the workload windows scheduled to occur in the near future is starting a bit early. Alternatively, it is possible that a next workload window is selected from the stored, workload-window definitions, irrespectively of start times. It is possible that the start time have not even been defined in the stored, workload-window information.

Figure 4:
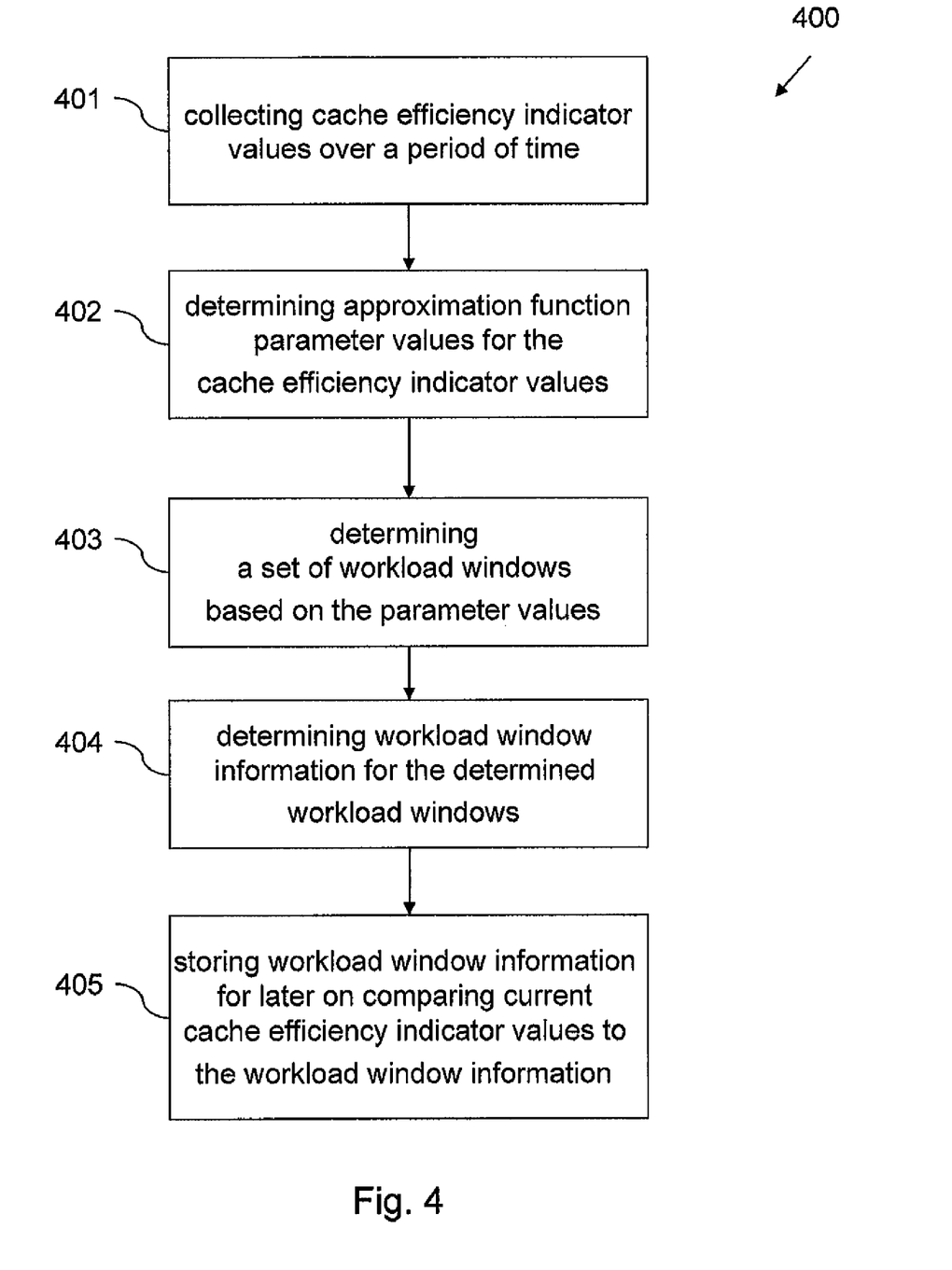
FIG. 4 shows, according to an embodiment, a flowchart of a method for identifying workload windows based on collected measurement results.

FIG. 4 shows a flowchart of a method 400 for identifying workload windows based on collected measurement results. In block 401, the database systems collects time series of current, cache-efficiency-indicator values over a period of time, for example, over 24 hours or over a week. As an example, the database system may collect measured hit ratios for the cache fragments. In block 402, the database system determines approximation-function-parameter values for the collected, cache-efficiency-indicator values. If the approximation function has only one parameter, then it is possible to determine the parameter value for each measured, cache-efficiency-indicator value. Determining the parameter values enables continuous adjustment of cache fragment sizes during operation and still detection of constant workload, Because adjustment of the cache fragment sizes affects the cache-efficiency-indicator values, it is not straightforward to determine time periods of substantially constant workload using the cache-efficiency-indicator values directly.

Figure 5:
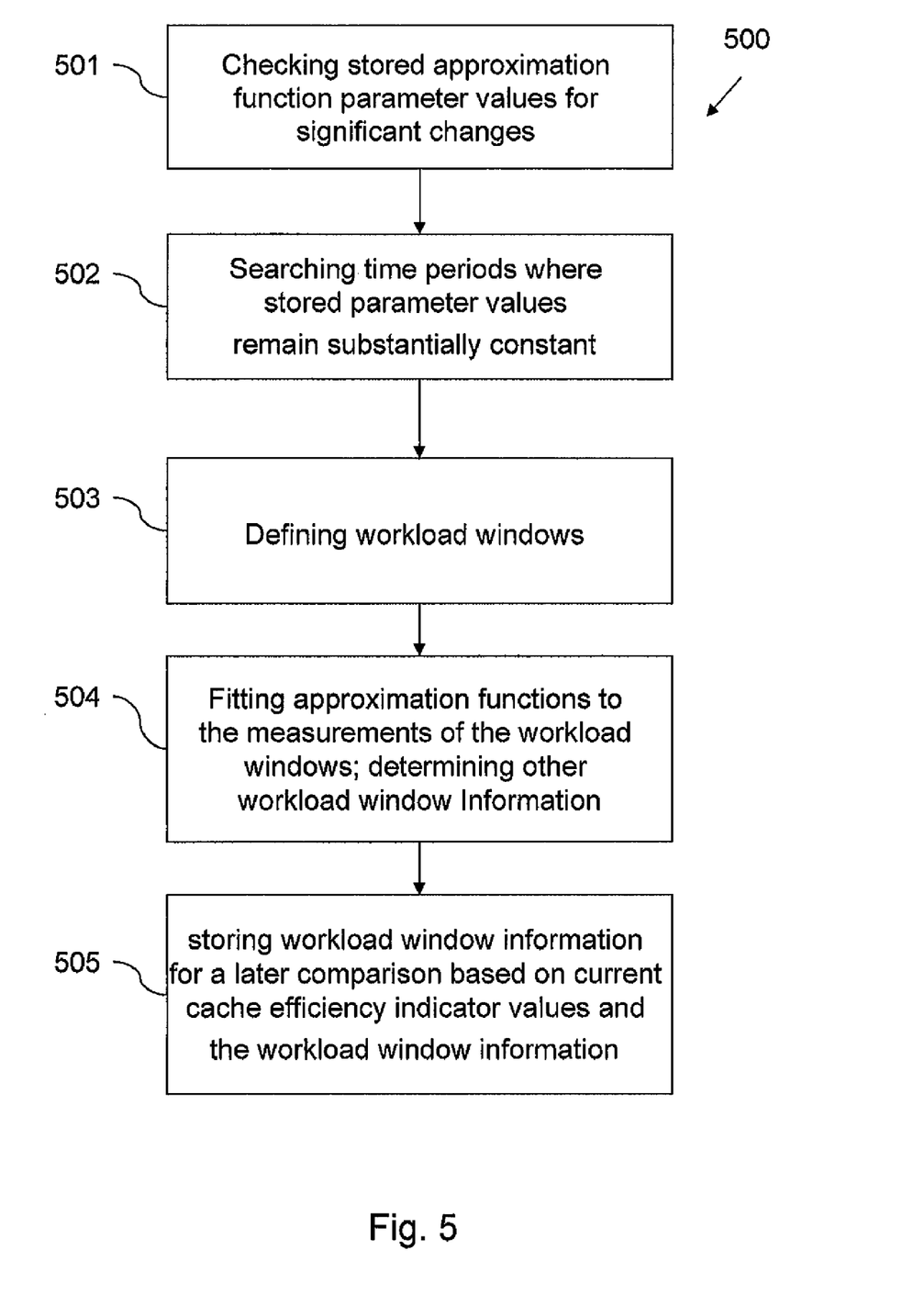
FIG. 5 shows, according to an embodiment, a flowchart of a more detailed method for providing a sequence of workload windows.
Figure 6A:
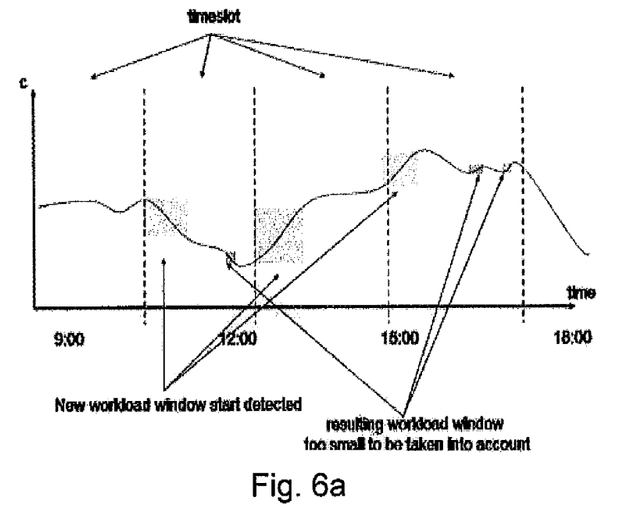
FIG. 6A shows, according to an embodiment, measurement results over nine hours during a day.
Figure 6B:
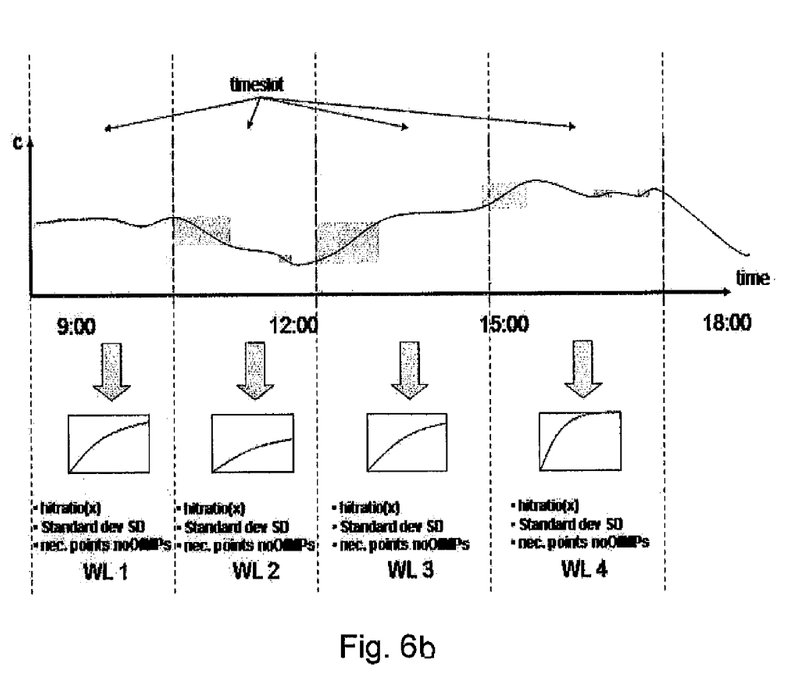
FIG. 6B shows, according to an embodiment, workload window and some workload-window information for the situation shown in FIG. 6A.

The database system then provides a set of workload windows based on the approximation parameter values in block 403. FIGS. 5, 6A and 6B show more details on determining workload windows. Basically, the database system divides the collection time period into subsequent time slots, each time slot having as homogenous workload as possible. It is of course possible that there are repeating sub-periods in the collection time period. As an example, measurements may be collected for a few working days and then subsequent time slots are determined based on the measurement results for a working day.

Because changing a cache fragment in size might impact the database system (if the size is reduced, data has to be dropped from the cache fragment, which might later be reused), the time period for a workload window must have a minimum (typically, a good minimum for workload windows is 5 minute). Otherwise switching over from workload window to workload window too often might not have the desired result.

In block 404, the database system determines workload-window information for the determined workload windows. The start and stop times of the workload windows may have been defined already in block 403. Information describing the database behaviour, for example cache-fraction-specific approximation functions or parameters for approximation functions, is determined here based on the measurement results. In block 405, the database system stores the sets of workload-window information for a later comparison based on current, cache-efficiency-indicator values and the sets of workload-window information.

Because each workload window has an approximation function for the hit ratio assigned, the system can use those approximation functions to calculate the right total memory size for all cache fragments and the right distribution of the memory among those cache fragments. This adjustment of the memory sizes can be done independent from the workload-window definition and from switching between workload windows. It will always use the currently active workload windows and thereby the currently active approximation functions. Typically this adjustment will be done on a regular base (e.g. each 5 minutes).

FIG. 5 shows, for an embodiment, a flowchart of a method 500 for determining a sequence of workload windows based on collected, approximation-parameter values. The determined values for c (or other parameters) of the approximation functions are used as criteria of homogenous activity. The method 500 is typically carried out repeatedly, for example, on a regular basis (e.g. every 24 hours). In block 501, the stored parameter values are checked for significant changes. Significant changes are increases or decreases of the parameter values which are outside of the respective standard deviation of the parameter values. The significant changes can be found, for example, based on high gradients in parameter values. In block 502, the cache controller searches for periods, where the parameter values are practically constant. One approach would be the calculation the standard Gaussian distribution for the approximation parameter C in a certain time period. If there is available some information on a probably time period, when the workload was substantially constant, that time period may be selected as a starting point for determining workload windows. As a further example, a time period whose length is the minimum workload window length may be used. Values of parameter C, subsequent to this time period, are added to the same time period, if the parameter values are in accordance with the Gaussian distribution. In other words, the time period is prolonged. If the subsequent values of C are not in line with the Gaussian distribution, a new time period (a new group of subsequent C values) is started. After going through all measured parameter values, each group which is too short or has too few points is merged with an adjacent group having the closest value for the parameter C. A second approach could be to define a maximum change rate for values of C. If the maximum change rate is detected in the measurement data, it is interpreted as a start of a new workload window. Also in this approach, it is possible to merge short subsequent time periods into workload windows. In block 503, a workload window is defined. The workload window may be the period between two significant changes in the stored parameter values. Too short workload windows are typically ignored, and it is possible to define a lower limit for the workload window length. The exact start and stop time of the workload window may be the time at which c is exactly between the average of c of the workload windows before and after the significant change. In block 504, at least the approximation function is fitted to the measured, cache-efficiency-indicator values of each workload window. Also standard deviation of the parameter values or any other statistical information about the parameter values may be stored as workload-window information. At least the approximation-function parameters are stored as workload-window information in block 505.

FIG. 6A shows, for an embodiment, measurement results of parameter c over nine hours during a day. FIG. 63 shows, according to an embodiment, typical workload-window information. In this example, for each identified workload window, the workload-window information includes approximation functions for the behaviour of the cache fragments. As discussed above, these approximation functions typically represent hit ratio (or other relevant factor) as a function of the cache fragment size. In addition to the approximation functions (or parameters of the approximation functions), standard deviation between the measured, cache-efficiency-indicator values and the approximation function may be stored as part of the workload information. The standard deviation (SD) is an indicator of how well the approximation functions fit to the measurement results. The standard deviation values can be used later on when identifying start of a next workload window. Alternatively, it is possible to use other metric than the standard deviation for measuring the goodness of the fit.

The standard deviation (SD) can also be used to calculate how many measured points noOfMPs are necessary to associate the measured points with a correct approximation curve, if there is more than one possible approximation curve. Information indicating the number of measurement points necessary for selecting a correct approximation curve may also be stored as workload-window information.

Figure 7:
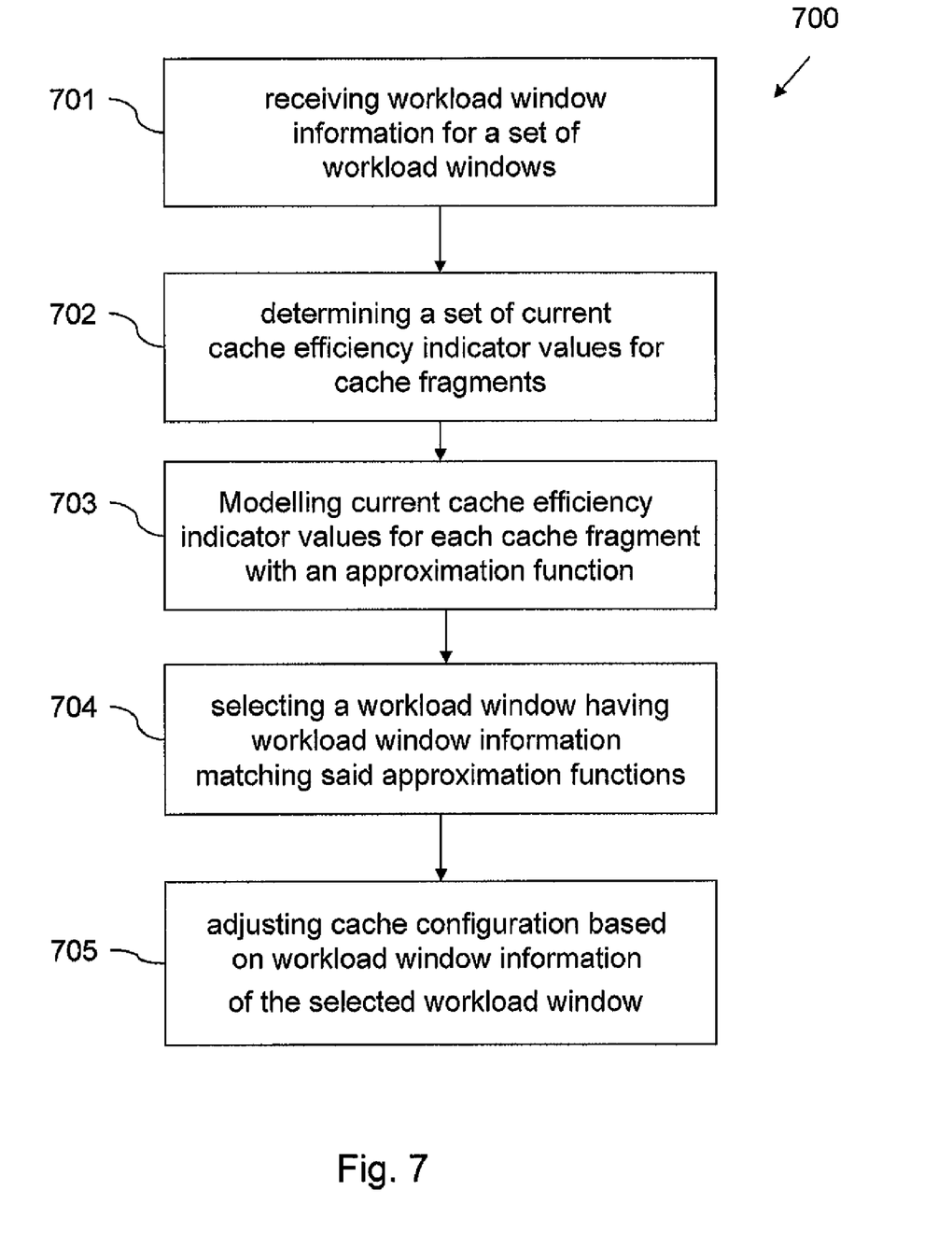
FIG. 7 shows, according to an embodiment, a flowchart of a method for adjusting cache configuration in a database system having at least one cache fragment.

FIG. 7 shows, as an example, a flowchart of a method 700 for adjusting cache configuration in a database system having at least one cache fragment. Here it is assumed workload-window information for a set of workload windows is stored in the database system. It is irrelevant for method 700, how this workload-window information has been determined. This workload-window information may have been obtained using a method as described in connection with FIGS. 4, 5, 6a and 6b. As a further example, the workload-window information may have been determined based on off-line simulations of cache behaviour.

In block 701, the database system receives the workload-window information from storage. During operation of the database system, one workload window of the set of workload windows is the current workload window. In block 702, the database system determines a set of current, cache-efficiency-indicator values for the cache fragments. As discussed above, the cache-efficiency-indicator values may be hit ratios. This set of current, cache-efficiency-indicator values typically relates to a plurality of measurement time instances, as discussed in connection with block 704 below. In block 703, the current, cache-efficiency-indicator values for each cache fragment are modelled with an approximation function.

In block 704, the database system selects a workload window having workload-window information matching the approximation functions of the current, cache-efficiency-indicator values. The comparison in block 704 is typically between approximation-parameter values (between a value determined for the current, cache-efficiency-indicator and a value stored as part of workload-window information). Block 704 is typically done after each measurement of cache-efficiency-indicator values. Typically, the workload window having approximation functions resembling most closely the measurement points is selected. This can be measured, for example, by the difference between the standard deviation (SD) stored for the workload window and the standard deviation determined for the measurement points SDComp: DiffSD=abs(SD−SDComp). The smallest difference DiffSD is selected. The difference DiffSD takes into account all cache fragments. The number of measured, cache-efficiency-indicator values used in the comparison may be, for example, the noOfMPs value discussed above or a predetermined fixed value. An advantage of using a predetermined fixed value is that this number may be specified to be small, and this way it is possible to react to quickly changing workload. On the other hand, an advantage of using the noOfMPs value is the reliability in choosing a correct approximation function.

It is appreciated that the selection of the new active workload window may use information about the nominal starting times as an additional criterion. For example, if there are two workload windows that correspond quite closely to the current cache behaviour and one of them is expected to start in the near future, then this once can be selected as the new active workload window.

In block 705, the database system adjusts cache configuration based on the approximation functions assigned to the currently used workload windows.

Figure 8:
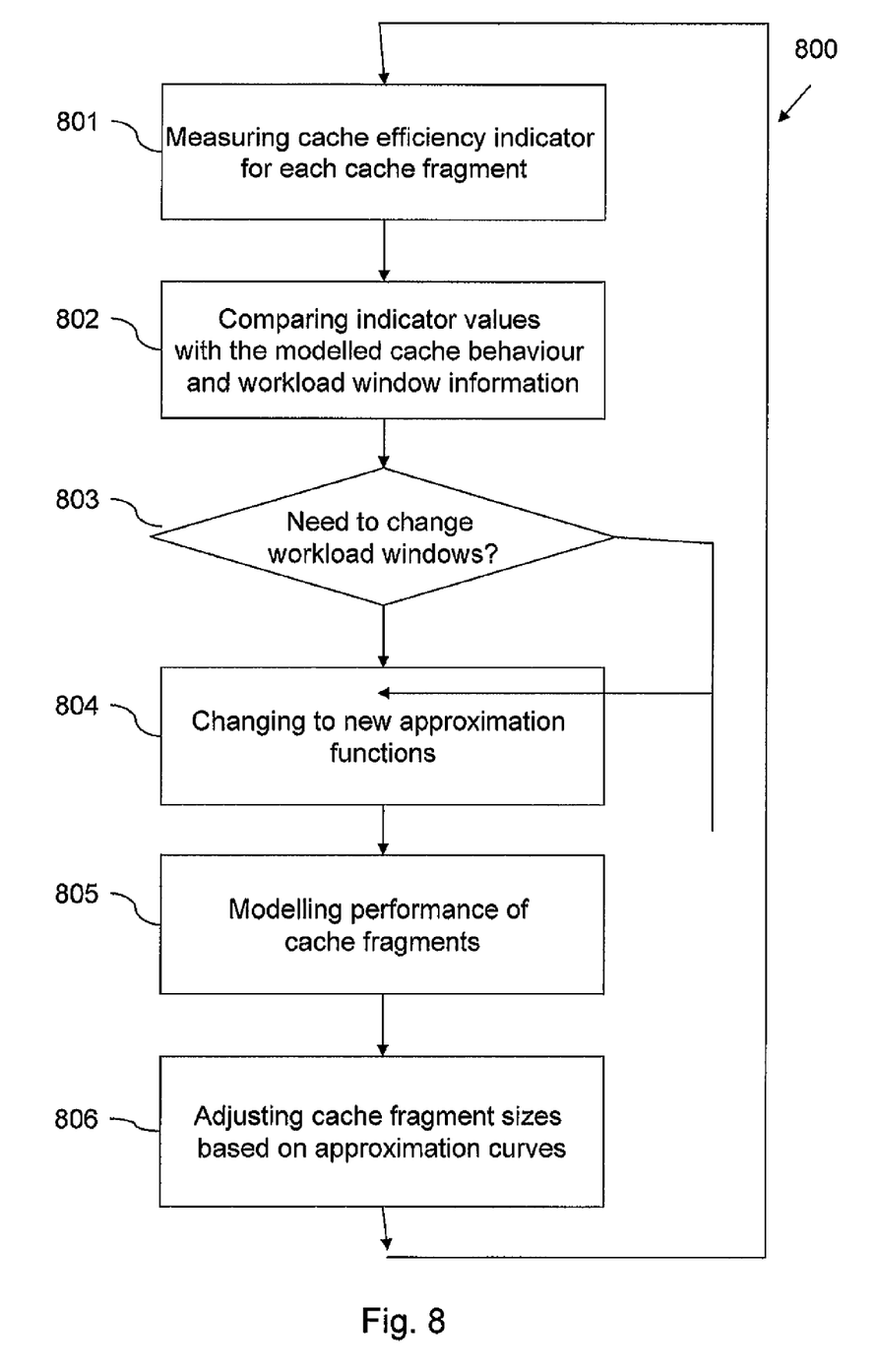
FIG. 8 shows, according to an embodiment, a flowchart of a method for determining whether there is need to change the active workload window.

FIG. 8 shows, according to an embodiment, a method 800 for determining whether there is need to change the active workload window. Typically, blocks 801 to 803 of method 800 are carried out periodically to respond to new workload very quickly, for example every one to two minutes.

In block 801, the database system measures a cache-efficiency-indicator value for each cache fragment. These measured values are typically stored in the history information, and also the currently used approximation function is typically continuously updated by the new measured values. In block 802, a set of latest cache-efficiency-indicator values are compared to the current approximation functions. As mentioned, the current approximation function may be adjusted by each new measured value. In block 803, the database system determines whether there is a need to change workload windows. If the approximation function of the currently active workload window is still providing a good fit for the latest measured, cache-efficiency-indicator values, then there typically is no need to change workload windows. If the workload window is changed, the database system changes to a new active approximation function in block 804 (defined by the matching workload-window information). In block 805, the database system models the performance of the cache fragments. The system will use those approximation functions to calculate this cache configuration allowing the database manager to find most data in the cache. In block 806, the database system adjusts the cache fragment sizes based on the approximation curves determined in block 804.

Figure 9:
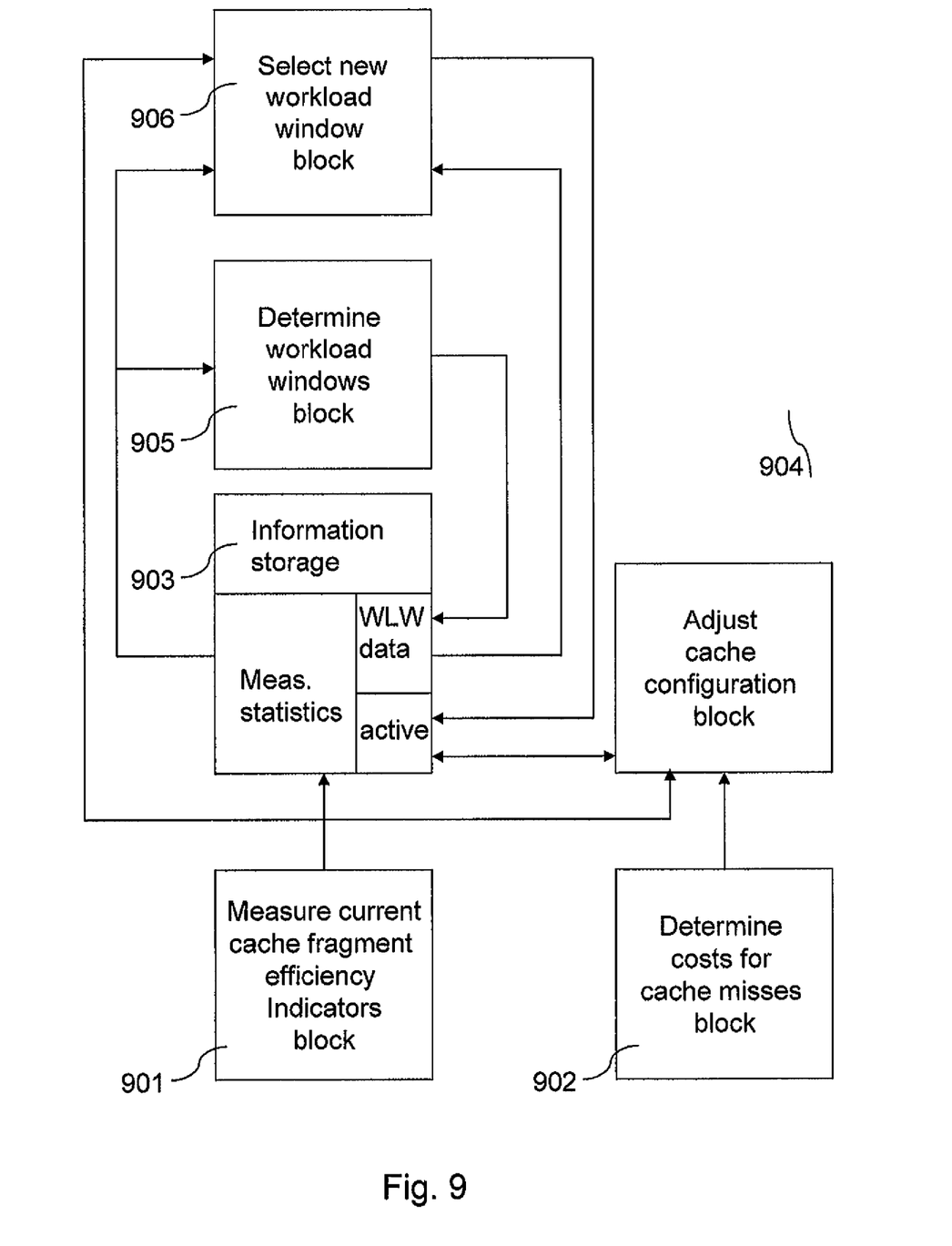
FIG. 9 shows, according to an embodiment, a schematic block diagram of a cache controller in accordance with an embodiment of the invention.

FIG. 9 shows, according to an embodiment, a block diagram for illustrating how the various features discussed above are related to each other. The cache controller measures current, cache-efficiency-indicators (block 901) and stores the results as measurement statistics in the information storage 903 (number of getpages, synchronous read pages, calculated hit ratio, approximation parameter c). In the information storage, also workload-window information is stored. The currently active workload window is indicated, so that the cache controller is aware of the current workload window.

The cache controller uses information about current, cache-efficiency-indicators from block 901 also for adjusting cache configuration, more particularly cache fragment sizes, by block 904. Adjustment of cache configuration needs information about the processing times for fetching data from disk to the cache and this information is obtained from block 902 which determines the costs in processing time for cache misses. The adjustment of cache configuration may update the workload-window information of the currently active workload in the information storage 903. The current approximation functions (that is, current parameter values) of the cache fragments may thus be updated by the adjustment block 904.

The cache controller may determine the workload windows and workload-window information using block 905, in accordance with the method discussed in connection with FIGS. 4 to 6B. As a further option, the workload-window information may be input, for example, by a database administrator or a simulation system. Block 905 takes measurement values as input from block 903 and outputs workload-window information to block 903. It is also possible that the functionality of block 905 is omitted. In this case, the cache controller typically activates workload-window information based on the start and stop times of the workload windows. It is appreciated that block 905 provides a more flexible approach.

Selection of the workload window (optional block 906) uses the current, cache-efficiency-indicator values from block 901. In block 906, a workload window having workload-window information matching current, cache-efficiency-indicator values is selected, as discussed in connection with FIGS. 7 and 8.

It is appreciated that the functionality of only one of the blocks 906 and 905 may be present in a cache controller. It is also appreciated that the functionality ascribed to the blocks in FIG. 9 may be arranged differently in a cache controller. The number and functionality of different blocks or other parts of the cache controller may thus be different than shown in FIG. 9.

As a summary of some of the advantages of embodiments of this invention the following can be said. The workload caused by user actions is typically in continuous change. Furthermore, also batch jobs can begin delayed or premature some minutes or hours, or the batch jobs can abort premature or be delayed. Continuing with the currently active cache settings may have a dramatic negative impact to the database performance, when workload changes. Therefore the ability to detect, if new workload is coming in, or to detect if the start and stop of workload windows is premature or delayed, it is possible to adjust the cache configuration efficiently and thereby increase the cache performance. Furthermore, the ability to determine workload windows based on collected, cache-efficiency-information also (additionally or alternatively) enhances the ability to configure the cache and increases cache performance.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer-program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM) compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Although the present embodiment has been described in accordance with the embodiments shown, one having ordinary skill in the art will readily recognize that there could be variations to the embodiments and those variations would be within the spirit and scope of the present embodiment. Accordingly, many modifications may be made by one having ordinary skill in the art without departing from the spirit and scope of the appended claims.

The invention claimed is:

1. A computer-implemented method for providing workload windows in a database system having at least one cache fragment, the method comprising:
   collecting cache-efficiency-indicator values of an at least one cache fragment during operation of a database system over a period of time;
   providing approximation-function-parameter values for the collected, cache-efficiency-indicator values calculated with an approximation function as exp(c*x) where c is a negative parameter and x is a size of the at least one cache fragment;
   providing a set of workload windows based on the approximation-function-parameter values;
   providing workload-window information for the set of workload windows, the workload-window information including at least one approximation-function-parameter value representing each member of the set of workload windows;
   storing the workload-window information for a comparison based on the collected cache-efficiency-indicator values and the workload-window information;
   selecting a workload window having first workload-window information matching the approximation function modelling a set of current cache-efficiency-indicator values; and
   adjusting cache configuration based on the first workload-window information of the selected workload window.

2. The computer-implemented method of claim 1 wherein providing the set of workload windows comprises finding time periods where the approximation-function-parameter values remain substantially constant.

3. The computer-implemented method of claim 1 further comprising discarding a potential workload window if the duration of the potential workload window is shorter than a predefined value.

4. The computer-implemented method of claim 1, wherein the workload-window information comprises at least one of the following: start time of a workload window, stop time of a workload window, and statistical information about the approximation-function-parameter values within the workload window.

5. The computer-implemented method of claim 1 further comprising:
   providing a set of current, cache-efficiency-indicator values for the at least one cache fragment; and
   modelling the current, cache-efficiency-indicator values for each cache fragment with an approximation function.

6. The computer-implemented method of claim 5, comprising updating the workload-window information based on the set of current, cache-efficiency-indicator values.

7. A database system comprising at least one cache fragment and a cache controller, the cache controller configured to:
   collect cache-efficiency-indicator values of the at least one cache fragment over a period of time;
   provide approximation-function-parameter values for the collected, cache-efficiency-indicator values calculated with an approximation function as exp(c*x) where c is a negative parameter and x is a size of the at least one cache fragment;
   provide a set of workload windows based on the approximation-function-parameter values;
   provide workload-window information for the set of workload windows based on the collected, cache-efficiency-indicator values, the workload-window information including at least one approximation-function-parameter value representing each member of the set of workload windows;
   store the workload-window information for a comparison based on collected cache-efficiency-indicator values and the workload-window information;
   select a workload window having first workload-window information matching the approximation function modelling a set of current cache-efficiency-indicator values; and
   adjust cache configuration based on the first workload-window information of the selected workload window.

8. The database of claim 7, wherein providing the set of workload windows comprises finding time periods where the approximation-function-parameter values remain substantially constant.

9. The database of claim 7 further comprising discarding a potential workload window if the duration of the potential workload window is shorter than a predefined value.

10. The database of claim 7, wherein the workload-window information comprises at least one of the following: start time of a workload window, stop time of a workload window, and statistical information about the approximation-function-parameter values within the workload window.

11. The database of claim 7 further comprising:
   providing a set of current, cache-efficiency-indicator values for the at least one cache fragment; and
   modelling the current, cache-efficiency-indicator values for each cache fragment with an approximation function.

12. The database of claim 11 comprising updating the workload-window information based on the set of current, cache-efficiency-indicator values.

13. A computer program product comprising a non-transitory computer-readable medium including a non-transitory computer-readable storage medium, wherein the non-transitory computer-readable storage medium when executed on a data processing system causes the data processing system to:
- collect cache-efficiency-indicator values of at least one cache fragment over a period of time;
- provide approximation-function-parameter values for the collected cache-efficiency-indicator values calculated with an approximation function as exp(c*x) where c is a negative parameter and x is a size of the at least one cache fragment;
- provide a set of workload windows based on the approximation function parameter values;
- provide workload-window information for the set of workload windows based on the collected cache-efficiency-indicator values, the workload-window information including at least one approximation-function-parameter value representing each member of the set of workload windows;
- store the workload-window information for a comparison based on the collected cache-efficiency-indicator values and the workload-window information;
- select a workload window having first workload-window information matching the approximation function modelling a set of current cache-efficiency-indicator values; and
- adjust cache configuration based on the first workload-window information of the selected workload window.

14. The computer program product of claim 13, wherein providing the set of workload windows comprises finding time periods where the approximation-function-parameter values remain substantially constant.

15. The computer program product of claim 13 further comprising
discarding a potential workload window if the duration of the potential workload window is shorter than a predefined value.

16. The computer program product of claim 13 wherein the workload-window information comprises at least one of the following: start time of a workload window, stop time of a workload window, and statistical information about the approximation-function-parameter values within the workload window.

17. The computer program product of claim 13 further comprising:
- providing a set of current, cache-efficiency-indicator values for the at least one cache fragment;
- modelling the current, cache-efficiency-indicator values for each cache fragment with an approximation function.

18. The computer program product of claim 17, comprising
updating the workload-window information based on the set of current, cache-efficiency-indicator values.

* * * * *